(12) United States Patent
Coleman et al.

(10) Patent No.: US 7,617,603 B2
(45) Date of Patent: Nov. 17, 2009

(54) METHOD FOR INSPECTION AND REPAIR

(75) Inventors: Kent Coleman, Concord, NC (US); David Wayne Gandy, Concord, NC (US); Greg Frederick, Harrisburg, NC (US); Rich Tilley, Harrisburg, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 690 days.

(21) Appl. No.: 11/364,478

(22) Filed: Feb. 28, 2006

(65) Prior Publication Data

US 2006/0191119 A1 Aug. 31, 2006

Related U.S. Application Data

(60) Provisional application No. 60/656,958, filed on Feb. 28, 2005.

(51) Int. Cl.
*B23P 6/00* (2006.01)
(52) U.S. Cl. .............................. 29/890.031; 29/402.01; 73/622
(58) Field of Classification Search ............ 29/890.031, 29/402.01, 527.1; 73/622
See application file for complete search history.

(56) References Cited

U.S. PATENT DOCUMENTS

| | | | |
|---|---|---|---|
| 3,585,710 A * | 6/1971 | Wilder et al. ............ 228/124.1 | |
| 3,944,963 A | 3/1976 | Hively | |
| 4,047,659 A * | 9/1977 | Vucic ......................... 228/119 | |
| 4,049,954 A | 9/1977 | Da Costa Vieira | |
| 4,070,762 A | 1/1978 | Siddall | |
| 4,170,142 A | 10/1979 | Posakony et al. | |
| 4,195,530 A | 4/1980 | Ross et al. | |
| 4,203,069 A | 5/1980 | Davis | |
| 4,210,028 A | 7/1980 | Hildebrand | |
| 4,248,092 A | 2/1981 | Vasile et al. | |
| 4,283,615 A | 8/1981 | Vrillon | |
| 4,290,308 A | 9/1981 | Dau | |
| 4,303,885 A | 12/1981 | Davis et al. | |
| 4,305,661 A | 12/1981 | Pryor et al. | |
| 4,307,612 A | 12/1981 | Elsley et al. | |
| 4,320,661 A | 3/1982 | Peterson et al. | |
| 4,391,532 A | 7/1983 | Hara | |
| 4,393,711 A | 7/1983 | Lapides | |
| 4,403,860 A | 9/1983 | Pryor | |
| 4,406,856 A | 9/1983 | Wilkins et al. | |
| 4,428,237 A | 1/1984 | Zeger et al. | |
| 4,432,931 A | 2/1984 | Lockett | |
| 4,526,037 A | 7/1985 | Wentzell | |
| 4,546,314 A | 10/1985 | Minerbo et al. | |
| 4,546,315 A | 10/1985 | Minerbo et al. | |
| 4,615,477 A | 10/1986 | Spada et al. | |
| 4,694,549 A | 9/1987 | Rabe | |

(Continued)

*Primary Examiner*—David P Bryant
*Assistant Examiner*—Christopher M Koehler
(74) *Attorney, Agent, or Firm*—Curatolo Sidoti Co. LPA; Joseph G. Curatolo; Salvatore A. Sidoti

(57) ABSTRACT

A method for the inspection and repair of a tube includes electrical discharge machining an access hole into the tube, optionally at or near the uppermost location on the tube, near the upper header; performing inspection of the tube, optionally using a visual or an eddy current inspection technique; providing an inner diameter flush-mounted plug insert which has been machined for re-inserting into the access hole; and attaching the plug insert to the tube.

14 Claims, 5 Drawing Sheets

U.S. PATENT DOCUMENTS

| | | | |
|---|---|---|---|
| 4,744,661 A | 5/1988 | Ulbers et al. | |
| 4,925,074 A | 5/1990 | Wood | |
| 4,982,158 A | 1/1991 | Nakata et al. | |
| 5,023,549 A | 6/1991 | Dau et al. | |
| 5,184,391 A | 2/1993 | Fisk et al. | |
| 5,205,038 A | 4/1993 | Archer et al. | |
| 5,237,874 A | 8/1993 | Latimer et al. | |
| 5,430,270 A | 7/1995 | Findlan et al. | |
| 5,514,849 A | 5/1996 | Findlan et al. | |
| 5,573,683 A | 11/1996 | Findlan et al. | |
| 5,608,691 A | 3/1997 | MacLauchlan et al. | |
| 5,656,185 A | 8/1997 | Findlan et al. | |
| 5,698,787 A | 12/1997 | Parzuchowski et al. | |
| 5,705,741 A | 1/1998 | Eaton et al. | |
| 5,717,169 A | 2/1998 | Liang et al. | |
| 5,734,588 A | 3/1998 | Rose et al. | |
| 5,825,017 A | 10/1998 | Pryor | |
| 5,837,898 A | 11/1998 | MacLauchlan | |
| 5,977,513 A | 11/1999 | Findlan | |
| 6,070,467 A | 6/2000 | Rosenberg et al. | |
| 6,082,198 A | 7/2000 | Sabourin et al. | |
| 6,109,108 A | 8/2000 | Ohtani et al. | |
| 6,176,132 B1 | 1/2001 | MacLauchlan | |
| 6,188,643 B1 | 2/2001 | Liang et al. | |
| 6,211,482 B1 | 4/2001 | Findlan et al. | |
| 6,215,836 B1 | 4/2001 | Walker et al. | |
| 6,247,231 B1 | 6/2001 | Findlan et al. | |
| 6,259,523 B1 * | 7/2001 | Welker | 356/241.1 |
| 6,282,964 B1 | 9/2001 | Hancock et al. | |
| 6,357,470 B1 | 3/2002 | Evans et al. | |
| 6,449,326 B1 | 9/2002 | Walker et al. | |
| 6,578,424 B1 | 6/2003 | Ziola et al. | |
| 6,596,957 B2 * | 7/2003 | Gandy et al. | 219/61 |
| 6,666,095 B2 | 12/2003 | Thomas et al. | |
| 6,673,169 B1 | 1/2004 | Peterson, Jr. et al. | |
| 6,736,011 B2 | 5/2004 | Zayicek et al. | |
| 6,935,036 B2 | 8/2005 | Raab et al. | |
| 2005/0126664 A1 | 6/2005 | Peterson, Jr. et al. | |

\* cited by examiner

METHOD FOR INSPECTION AND REPAIR

CROSS-REFERENCE TO RELATED APPLICATIONS

This application claims the benefit of the filing date of the U.S. Provisional Application for Patent Ser. No. 60/656,958 filed Feb. 28, 2005.

FIELD OF THE INVENTION

A method of inspection and repair of boiler and water-wall tubing, such as heat recovery steam generator (HSRG) tubes and the like, for electricity producing power plants, such as fossil fuel plants.

BACKGROUND

Boiler and water-wall tubing are susceptible to a number of forms of damage which can result in tube damage if left unchecked. Such tube failures remain the number one cause of forced outages and availability loss in fossil plants worldwide.

Corrosion-fatigue damage in water-walls has become a major issue for many utilities. The inability to adequately detect or size such damage has lead to many early failures that could have been avoided if proper inspection access was available. Internal inspection methods are commonly employed for heat exchangers and steam generator tubing.

Unlike other components associated with fossil power production, inspection of boiler and water-wall tubing is not routinely performed. Access to the inside surface of such tubing is complicated since inspection holes are typically not available. Accessibility to the inside surface of tubing would enable utilities to routinely inspect suspect areas within the tubing and should substantially reduce the number of forced outages associated with tube failures.

Commonly assigned U.S. Pat. No. 6,596,957 is directed to a method and apparatus and prefabricated replacement tube for localized water-wall repair, and is incorporated by reference as if fully written out below. Also, commonly assigned U.S. patent application entitled "Method For Repairing Heat Recovery Steam Generator Tube-To-Header" and filed on even date is incorporated by reference as if fully written out below.

Formerly, no recognized methods existed to access the inside wall of water-wall or boiler tubing to perform inspection for corrosion-fatigue damage of the inside diameter (ID) surfaces short of severing a section of the tube, inserting an inspection device, inserting a replacement tube section upon completion of the inspection, and manually welding the replacement tube in place. This approach was time consuming, costly, and could often result in inferior quality of replacement welds.

SUMMARY

A method is provided to allow access to the inside of boiler and water-wall tubing to perform inspections of the tube inner diameter (ID) surface without the need to remove a section of the tube, and then perform a permanent repair such as, in one embodiment, by using automated gas tungsten-arc (GTA) welding equipment. Formerly, inspection was not achievable, short of removing a section of the tubing, since no quick, reliable method existed to repair the tube. The present method allows inspections to be performed and then repairs to be made to the tube in a rapid and consistent manner. For water-walls (30), the access holes (15) for inspections may be created from either the cold side or the hot side of the unit. The repair/inspection crew may remove the boiler skin from the cold side at the proper elevation (typically near the upper elevation of the water-wall) and then apply the method from one side or outside of the tube.

A method is provided for the inspection and repair of a tube comprising:

A. Creating an access hole into the tube, optionally at or near the uppermost location on the tube (e.g. near the upper header);

B. Performing inspection of the tube, optionally using a visual or an eddy current inspection technique;

C. Providing an inner diameter flush-mounted plug insert, which has been prepared for re-inserting into the access hole; and, D. Attaching the plug insert to the tube.

DETAILED DESCRIPTION

The inspection and repair method provided herein provides access to perform inspection of the tubing inner diameter (ID) surfaces. Also, the method provides an approach for repairing the tube with an ID flush-mounted insert plug that allows the tube to continue operating without any degradation in flow characteristics. Further, the flush-mount plug insert is secured in place by at least one of the following methods:

1) by high temperature brazing; or,
2) by use of an exothermic welding compound; or,
3) by welding.

Figure 1:
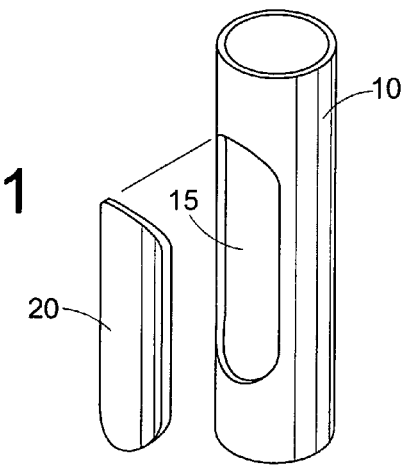
FIG. 1 illustrates a flush-mounted insert plug for repair of boiler/water-wall tubing.

The inspection and repair method may be accomplished by the following procedures:

A. Create at least one access hole (15) into the tube (10). In one embodiment this hole is created at or near the uppermost location on the tube (e.g., near the upper header). One method for creating the access hole (15) is by electrical discharge machining (EDM). Another means for creating the access hole (15) is by thermal cutting methods. Options for thermal cutting methods include, but are not limited to, plasma, fuel-oxygen, and laser methods. Yet another method for creating the access hole (15) is by standard machining methods. The dimensions of the hole and its shape are closely controlled in a manner to provide proper fit-up for the flush-mounted insert plug (20) in a later step. An illustrative, but non-limiting, design of an insert plug (20) is shown in FIG. 1.

B. Once the access hole (15) has been created, inspection can be performed using visual, eddy current, or any other inspection technique applicable to boiler, or water-wall, or HRSG tubing. Particularly where the access hole (15) has been machined near the upper location of the tube, an inspection device can simply be gravity fed into the tube through the access location.

C. An ID flush-mounted insert plug (20) is provided, which has been prepared, such as by machining, for re-inserting into the access hole (15) prepared according to A, above. The insert plug (20) may be carefully machined to match the contour of the ID of the tube such that flow restrictions are not an issue in future operation.

D. Attachment

1. In one embodiment, a high temperature braze compound is placed on the mating surfaces of both the existing tube (10) and the insert plug (20). In another embodiment the high temperature braze compound is placed on the mating surface of either the existing tube (10) or the insert plug (20). The high temperature braze compound may be a paste, tape, slurry, or other suitable form. The mating surfaces are then brought to a curing temperature between about 1100° F. and about 1300° F. to promote diffusion of the braze compound into the substrate surfaces, and to develop a high strength bond. The bond strength achieved should be at least similar to that of the base metal. The curing temperature range, between about 1100° F. and about 1300° F., is well above the typical operating temperature range of a conventional water-wall of approximately 800° F. to 900° F.

2. In an alternative embodiment, an exothermic welding compound is used to join the two mating surfaces. Exothermic welding is a joining process that utilizes a mixture of compounds which react in a strongly exothermic manner. In one embodiment, the exothermic welding compound is one wherein iron oxide reacts with aluminum to produce a molten steel reaction. In another embodiment, this exothermic welding compound is thermite.

3. A third alternative embodiment includes welding the insert back into place, in certain embodiments using automated welding. Details of welding methods included in this method follow below.

Any of these attachment technologies, when used for boiler, water-wall or HRSG tube inserts, will result in high quality welds or brazes with minimal upset reinforcement along the ID surface of the tube. The repair process will provide welds that can be performed repeatedly with high quality.

Figure 6:
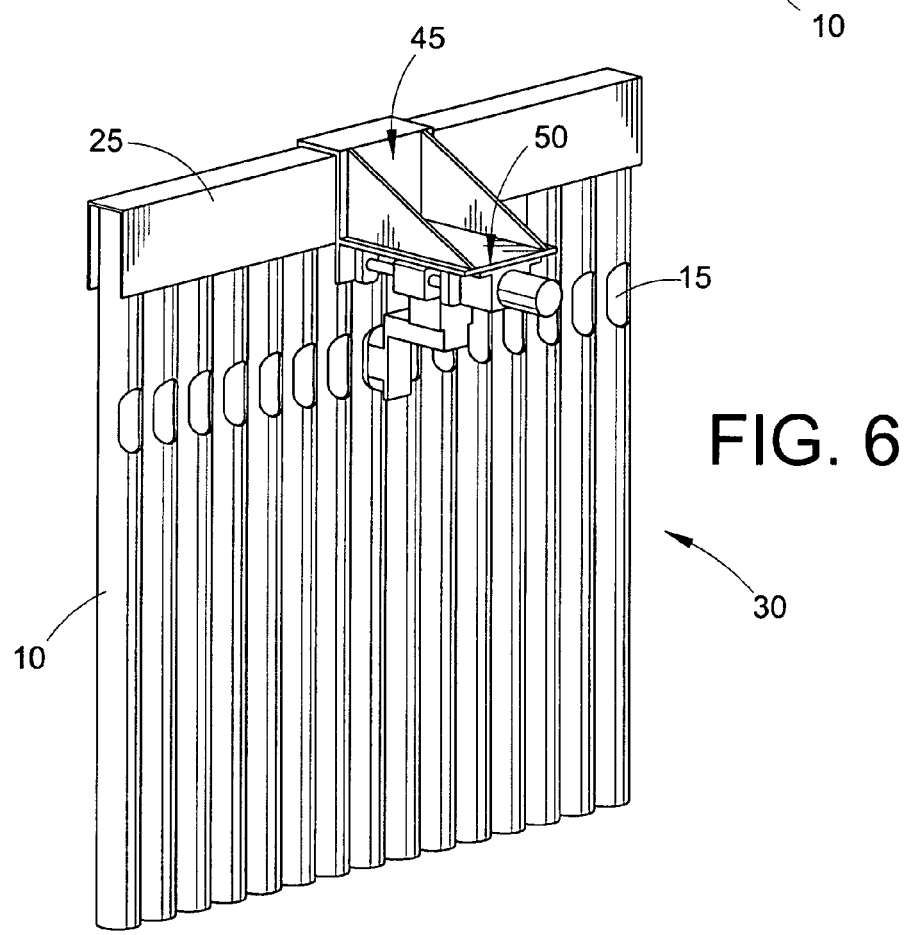
FIG. 6 is an oblique view of an access hole creation carriage mounted on a travel beam for creating access holes in multiple tubes.
Figure 7:
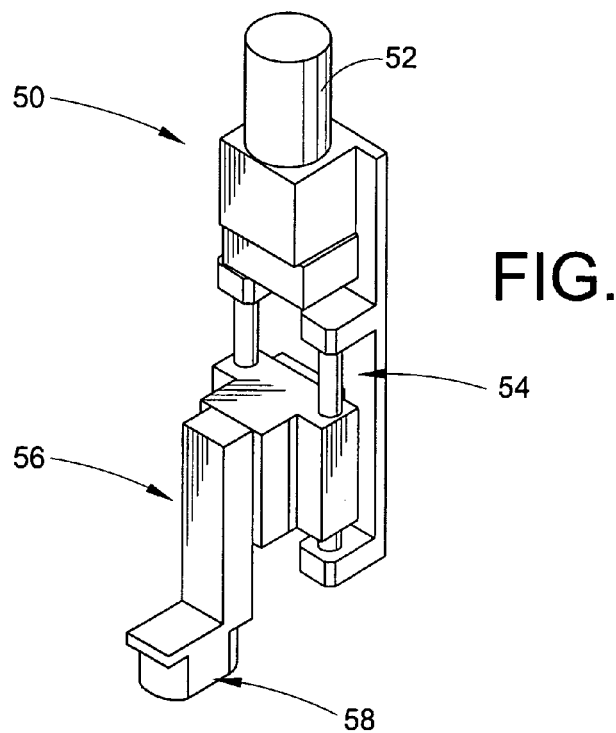
FIG. 7 is a close-up, oblique view of a slide assembly.
Figure 8:
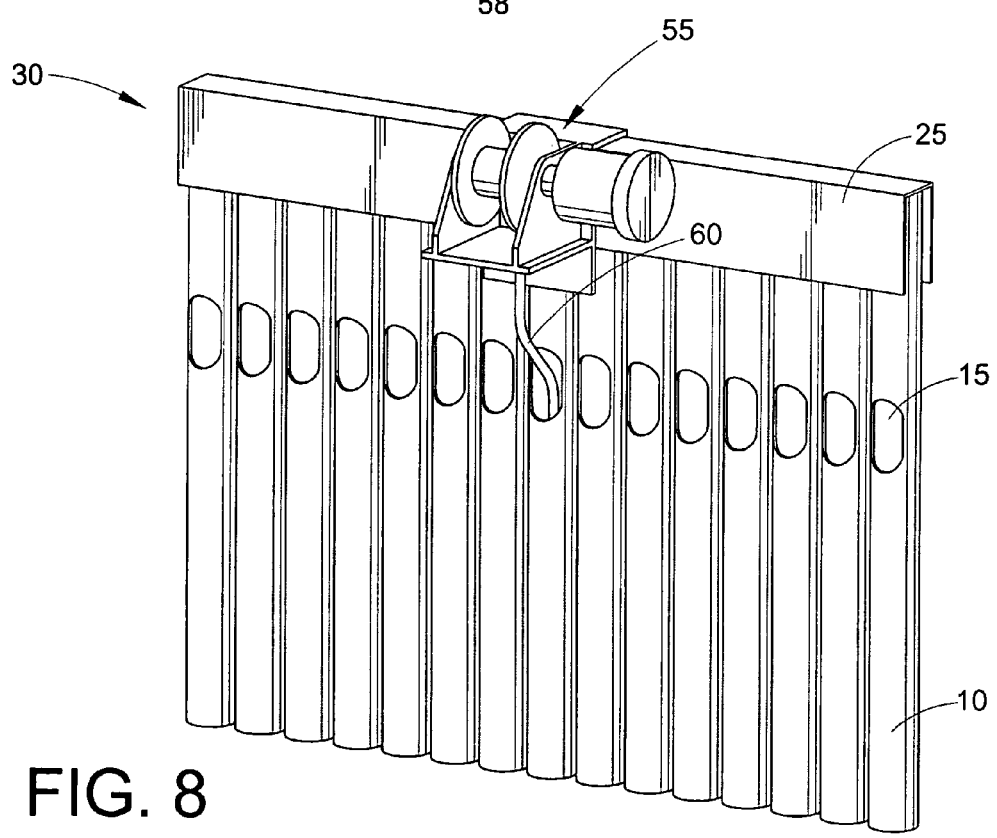
FIG. 8 is a close-up, oblique view of an inspection carriage mounted on a travel beam for inspecting multiple tubes.

By providing access to the inside surface of a tube (10), proper detection and sizing of cracks can be accomplished. The first step in performing water-wall tube inspection requires gaining access to the tube inner diameter. In order to do so, a travel beam (25) such as shown in section in FIG. 6 and in FIG. 8 is tack mounted to the water-wall (30). Once in place, an access hole creation carriage (45) and slide assembly (50) is placed on the travel beam (25) as shown in FIG. 6. The access hole creation carriage (50) is capable of indexing along the length of the travel beam (25) to center itself over each individual tube (10), machine the access holes (15), and provide final weld geometry for later welding. As shown in FIG. 7, one embodiment of the slide assembly (50) uses a lead screw and linear slide assembly (54) driven by a drive motor (52) for the ram axis; an electrode holder (56) and an electrode optimally sized for the access hole (58). In another embodiment the electrode holder can hold an initial electrode optimally sized for the access hole (58) and a secondary electrode profiled with a weld chamfer to prepare the access hole edges. Embodiments of the slide assembly (50) may also include a smaller extrusion on the bottom face of the initial electrode to cut a hole to install a capturing device for the tube cut-out. If used, EDM technology is capable of rapidly forming multiple access holes for inspection. Also, if used, EDM technology is fast, provides an excellent surface finish, and leaves no debris.

Following creation of an access hole (15), inspection can be performed. Once the access hole creation carriage (45) is removed or indexed to another tube position, an inspection carriage (55) capable of being positioned near the access hole (15) is mounted on the travel beam (25) as shown in FIG. 8. An inspection probe (60) from the inspection carriage (55) is then inserted into the access hole (15). In one embodiment the inspection probe is a borescope. In embodiments where the access hole (15) has been made near the top of the water-wall (30), gravity feed of the inspection probe is possible such that the inspection probe (60) can be lowered through the tube (10) to inspect for damage. Additional embodiments include those wherein, the inspection method can deliver video or eddy current inspection technologies for inspection of the inside diameter surface of the water-wall (30) or other tubing along with damage elevation/location. Some embodiments may include encoding capabilities to establish precise location (elevation) of damage along the tube length.

Figure 2:
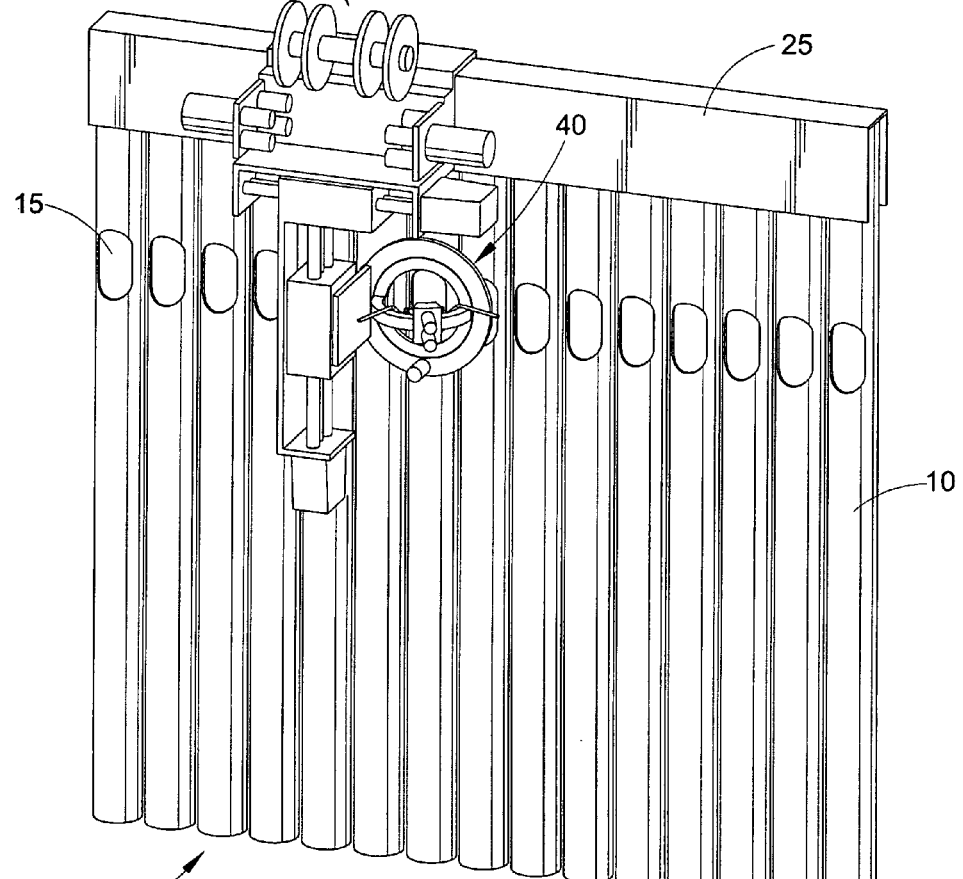
FIG. 2 is an oblique view of a water-wall welding system mounted on a travel beam for repairing access holes in multiple tubes after inspection.
Figure 3:
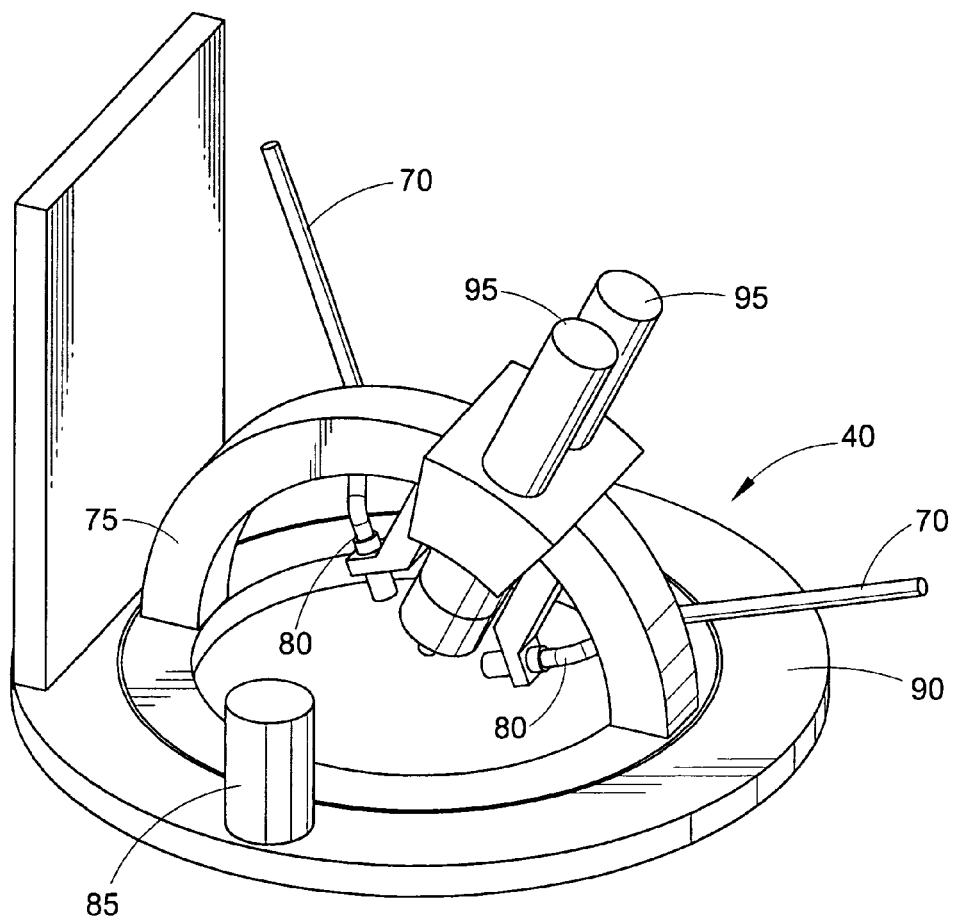
FIG. 3 is a close-up, oblique view of a 3-axis of motion weld head.
Figure 4:
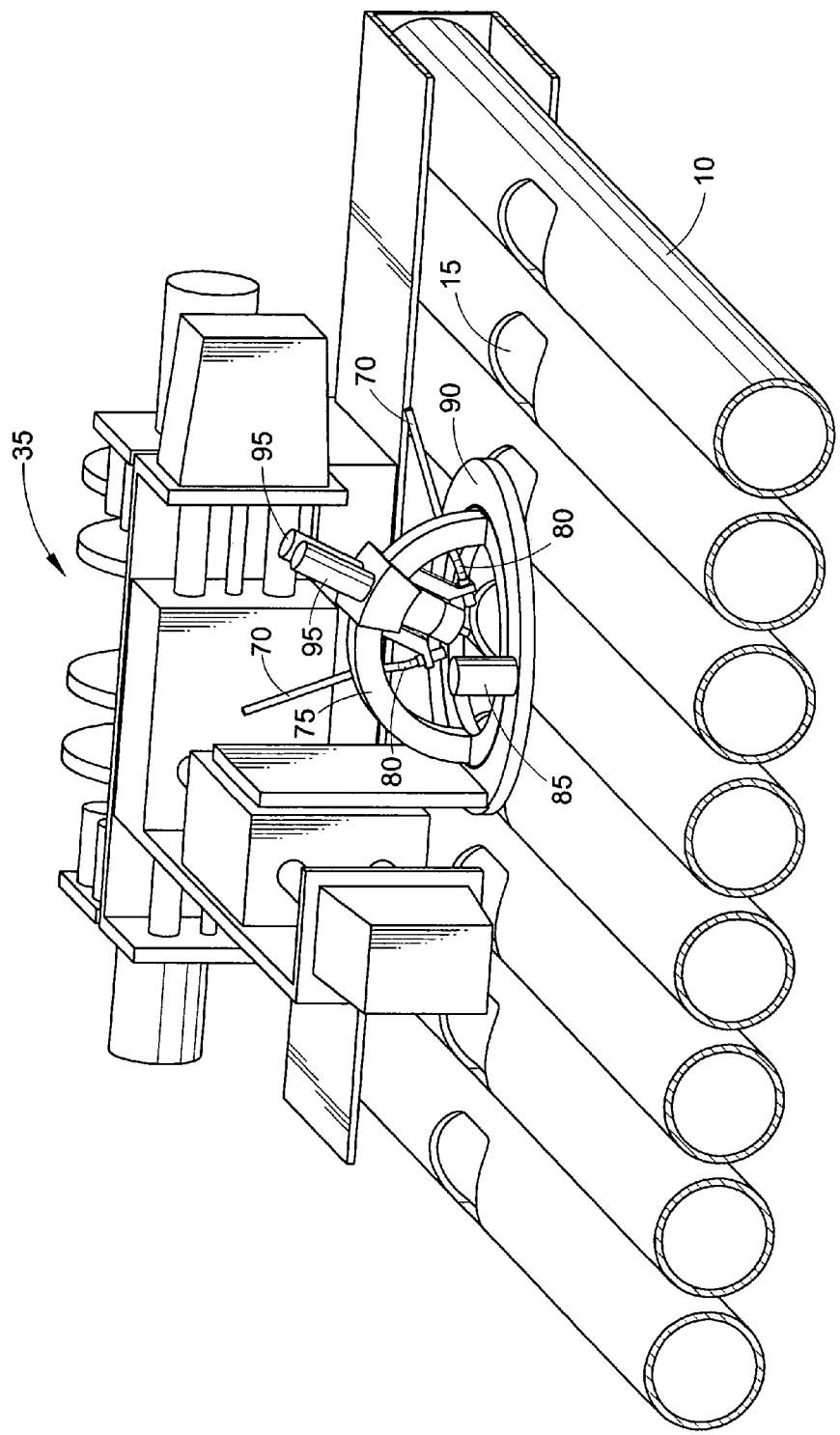
FIG. 4 is a close-up, oblique view of a 3-axis of motion weld head in place in the weld carriage.
Figure 5:
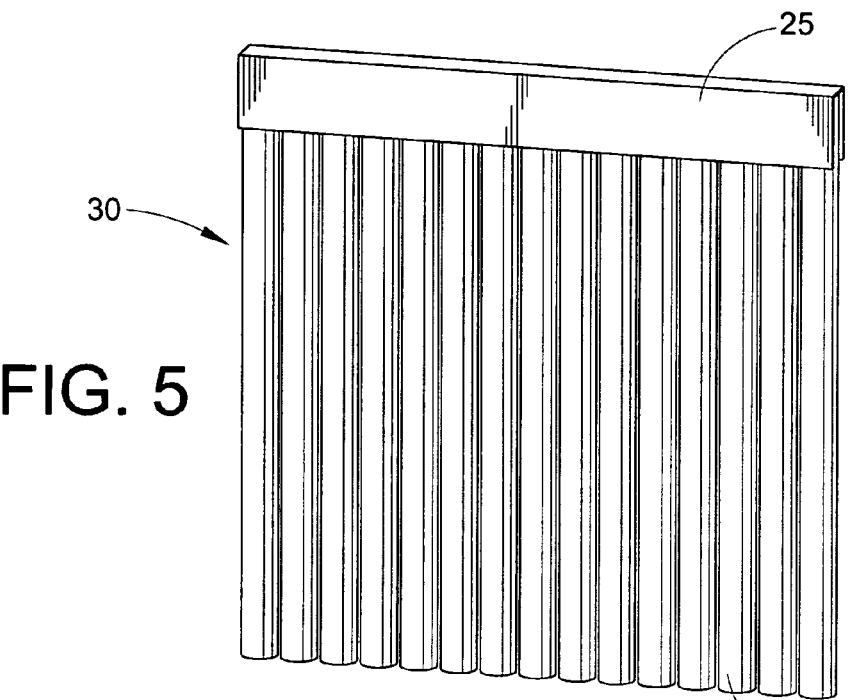
FIG. 5 is an oblique view of a water-wall with a travel beam mounted thereon.

Following the inspection activity, an insert plug (20) is welded or brazed into the access hole (15) to restore the pressure boundary of the water-wall (30) tube (10). In one embodiment this is done using automated GTA welding technology capable of rapidly inserting the replacement insert plug (20) to close the inspection access hole (15). A weld carriage (35) capable of indexing and centering itself on the access hole (15) is mounted on the travel beam (25) as shown in FIG. 2. The insert plug (20) is attached to the weld carriage (35) and is precisely aligned over the access hole (15). The weld head (40) tacks the insert plug (20) into place. In one embodiment, the closure weld may be performed using GTA "double-up" welding. In a another embodiment, the closure weld performed using GTA "double-up" welding is accomplished with a weld head (40) capable of 3-axis motion, enabling precise positioning of the torch assembly. In yet another embodiment, the closure weld performed using GTA "double-up" welding is accomplished with a weld head (40) capable of 3-axis motion which incorporates: 1) rotary-, 2) rotational/oscillation-, and 3) automatic voltage control (AVC)-capabilities, along with dual wire manipulators for welding both sides of the insert plug (20). As shown in FIG. 3. and also in FIG. 4, a suitable embodiment for a weld head with 3-axis motion includes: wire feed tubes, camera leads (optional), and shielding gas hoses (optional) (70); a weld head track (75) for positioning the weld head angle; wire feed positioners (80); a motor for rotation carriage (85); a carriage for rotation (90); drive motors (95) for wire feed and positioning weld head angle on a weld head track.

The primary applications for this inspection and repair method are for water-wall (30) and boiler tubing. Other tubing applications such as those found on ships, submarines, or in petroleum, chemical, or pulp and paper mills could also benefit from the present method. Each of these industries utilize miles of tubing that under most circumstances are not inspected; thus the present method would also be useable in these industries.

For a water-wall (30), this method could be applied from either side of the panel, that is, the furnace (hot) side or the back (cold) side. Performing such repairs from the back side of the water-wall (30) eliminates the expense of scaffolding the boiler. Alternatively, this method does not require cold side access on units where the presence of asbestos makes such access means undesirable.

Another area that could significantly benefit from the present method is heat recovery steam generators (HRSGs). Failures of HRSG superheater and reheater tubing are becoming more commonplace. The inspection and repair method described herein enables power producers to selectively inspect individual tubes on an as-needed basis.

The present method is capable of rapidly creating access holes into tubing, allowing inspection of the inside diameter of the tubing, and then closure of those holes, with permanent repair of the tubing in a short period of time. The inspection/repair device is capable of addressing multiple tube diameters and is capable of providing multiple access holes along the length of the travel beam. Additionally, this method will enable utilities to inspect multiple water-wall tubes from the inside of the tube. Further, this method provides a means for permanent repair within a short outage window.

It will be understood that the embodiments described herein are merely exemplary and that a person skilled in the art may make many variations and modifications without departing from the spirit and scope of the invention. All such modifications and variations are intended to be included within the scope of the invention as described herein. It should be understood that the embodiments described above are not only in the alternative, but can be combined.

We claim:

1. A method for the inspection and repair of a tube comprising:
    Mounting a travel beam to a water-wall; and, disposing an access hole creation carriage and slide assembly on the travel beam; wherein the access hole creation carriage is capable of indexing along the length of the beam and centering on each individual tube, creating the access holes in the tubes, and providing weld geometry for attaching a plug insert;
    Creating an access hole into the tube, optionally at or near the uppermost location on the tube, near the upper header;
    Performing inspection of the tube, optionally using a visual or an eddy current inspection technique;
    Providing an inner diameter flush-mounted plug insert, which has been prepared for re-inserting into the access hole; and,
    Attaching the plug insert to the tube.

2. The method of claim 1, wherein said attaching comprises placing a high temperature braze compound on mating surfaces of the tube or the plug insert, and curing at a temperature above the tube operating temperature, sufficient to promote diffusion of the braze compound into the mating surfaces, and to develop a bond.

3. The method of claim 2, wherein the cure temperature is between about 1100° F. and about 1300° F.

4. The method of claim 1, wherein said attaching comprises joining the mating surfaces with an exothermic welding compound.

5. The method of claim 1, wherein said attaching comprises welding the plug insert to the tube.

6. The method of claim 1, including gravity feeding an inspection device into the tube through the access hole.

7. The method of claim 1, wherein the plug insert is prepared to match the contour of the inner diameter of the tube.

8. The method of claim 1, wherein said attaching comprises gas tungsten arc welding.

9. The method of claim 1, wherein said creating an access hole comprises electrical discharge machining.

10. The method of claim 1, including preparing the plug insert for re-insertion by machining.

11. The method of claim 1, wherein said performing inspection comprises inserting an inspection probe into the access hole.

12. The method of claim 11, wherein the inspection probe is a borescope.

13. The method of claim 1, including encoding the location of damage in the hole.

14. The method of claim 1, including capturing the access hole tube cutout.

* * * * *

UNITED STATES PATENT AND TRADEMARK OFFICE
CERTIFICATE OF CORRECTION

| | | |
|---|---|---|
| PATENT NO. | : 7,617,603 B2 | Page 1 of 1 |
| APPLICATION NO. | : 11/364478 | |
| DATED | : November 17, 2009 | |
| INVENTOR(S) | : Coleman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Nineteenth Day of October, 2010

David J. Kappos
*Director of the United States Patent and Trademark Office*